March 25, 1958 P. V. WHITNEY 2,828,161
OVERLOAD RELEASE DEVICE
Filed Sept. 22, 1954
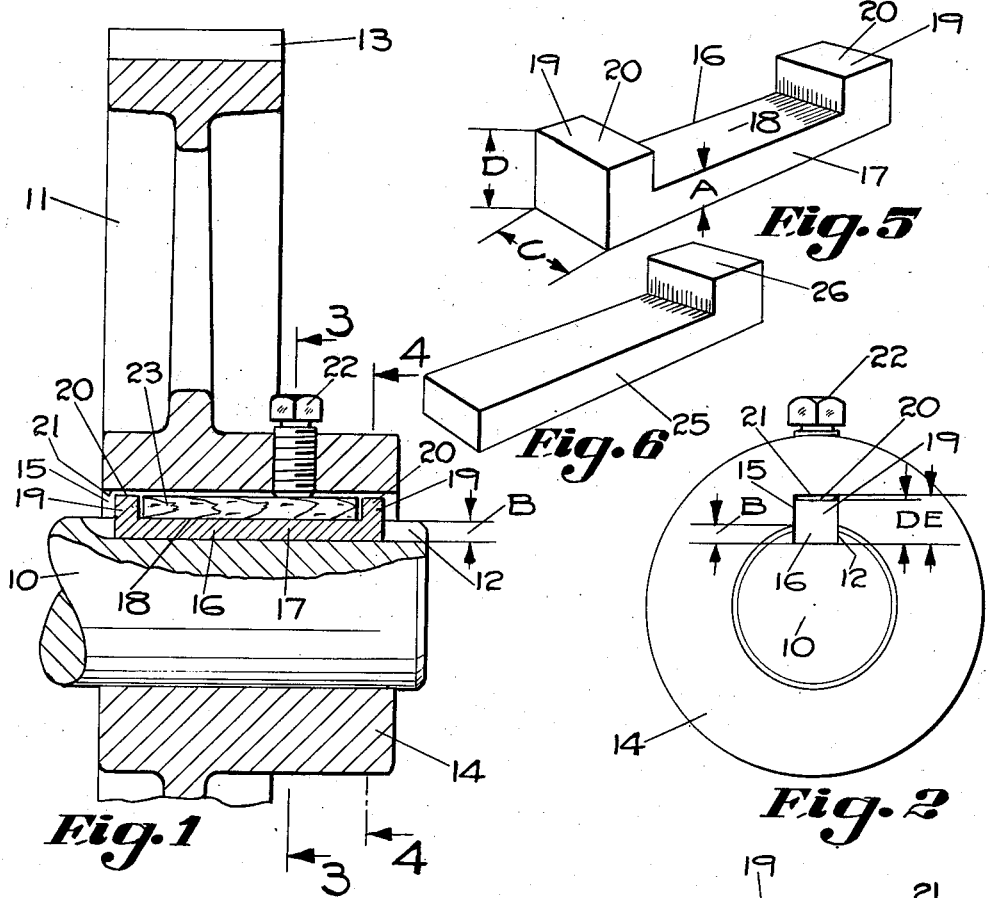
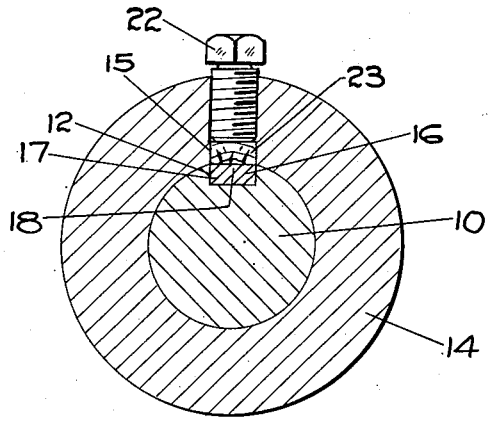
INVENTOR:
PAUL V. WHITNEY,
BY Donald J. Petrich,
AGENT.

United States Patent Office 2,828,161
Patented Mar. 25, 1958

2,828,161

OVERLOAD RELEASE DEVICE

Paul V. Whitney, Columbus, Ohio, assignor to The Jeffrey Manufacturing Company, a corporation of Ohio Application September 22, 1954, Serial No. 457,736

2 Claims. (Cl. 287—52.05)

This invention relates to overload release devices for interlocking two members, such for example as a shaft and a wheel, and one object of the invention is to provide an improved device or means for this use.

Another object of the invention is to provide an improved overload release interlock means for interlocking two members, which may be, for example, a shaft and a wheel in driving and driven relation, wherein the interlock means includes a key made of brittle material and having portions breakable therefrom to release the interlocked relation between said two members and wherein means is provided for retaining said key in its normal operating position, which means will not score either of said members when said key breaks and relative rotation between said members occurs.

Another object of the invention is to provide an improved overload release interlock means for interlocking two members in driving and driven relation, for example, wherein the interlock means includes a key made of brittle material or having a portion held in a keyseat in one of the members and another portion in a key slot in another of said members whereby upon the occurrence of an overload driving condition between the said two members said key means will break to release the interlock between the said two members.

Still another object of the invention is to provide an improved overload release key for interlocking two members in driving and driven relation in which the key is preferably made of brittle material and includes lug means breakable from the key to release the interlock between the said two members upon the occurrence of an overload driving condition between them.

Other objects of the invention will appear hereinafter the novel features and combinations being set forth in the appended claims.

In the accompanying drawings:

Fig. 1 is a view in section showing a portion of a gear wheel mounted upon a shaft and interconnected therewith by an overload release device including the features of the invention;

Fig. 2 is a view in elevation of one end of the wheel hub, shaft and overload release device seen in Fig. 1;

Fig. 3 is a view in section, the section being taken on line 3—3 of Fig. 1;

Fig. 4 is a view in section, the section being taken on line 4—4 of Fig. 1, but showing the hub, shaft and overload release device as they might appear after said overload release device has functioned to release the driving connection between the hub and shaft;

Fig. 5 is a view in perspective of the key seen in Fig. 1; and

Fig. 6 is a view in perspective of a modified form of overload release key including features of the invention.

The prior art is replete with overload release devices that include shear pins for releasably interconnecting two members such, for example, as a shaft and a wheel in driving and driven relation, which shear pins are usually made of tough steel or, not infrequently, of very tough wood or fibre-like substances and which must actually be cut or sheared in order to release the driving connection between the said driving and driven members. It is to be noted that the present invention differs from the usual overload release devices of the general type referred to in a number of ways and, particularly, in that it includes a breakable key rather than a shear pin and that this breakable key is made of a brittle, breakable material rather than a tough material and which may break or snap into two or more pieces to release or sever the driving and driven relation between the driving and driven members with which it is employed. New results and advantages of the present invention are set forth clearly hereinafter.

In Fig. 1 of the drawings there is shown a shaft 10 which may either drive or be driven by a wheel 11 mounted thereon. It is to be understood that the shaft 10 and wheel 11 shown are conventional machine elements and that they form but one example of many well-known machine elements or members which may be interconnected releasably by means of the present invention. For the purpose of the present description it will be assumed that the shaft 10 is the driving member and that the wheel 11 is the driven member.

As shown in the drawings, one end of shaft 10 forms a cylinder having a uniform diameter which is slotted or grooved to a uniform depth to provide an axially extending groove, key slot or keyway 12 having spaced parallel sides and a flat bottom. The wheel 11 shown in the drawings, is a conventional gear wheel having teeth 13 on its periphery and a hub 14. Hub 14 includes a central axial bore, the diameter of which is such that it and the shaft 10 will have a snug, push fit whereby, in the absence of an interlocking means, the shaft 10 and wheel 11 may rotate with respect to each other. Hub 14 is also slotted or grooved to a uniform depth to provide an internal axially extending groove, key slot or keyway 15 having spaced parallel sides and a flat bottom. As indicated in Figs. 1 through 3 of the drawings, when the wheel 11 is mounted on shaft 10 the grooves, key slots or keyways 12 and 15 in the shaft 10 at hub 14 respectively are aligned whereby they co-operate to form complete rectangular chamber, keyway or opening, half in the shaft and half in the hub, in which an ordinary rectangular key might be placed to interlock the shaft 10 and wheel 11 positively.

According to this invention, however, the shaft 10 and hub 14 are releasably interlocked by an overload release key 16 which is contained within the complete keyway formed by the slots 12 and 15. Key 16 includes an elongated body portion 17 adapted to be fitted entirely within the groove, keyseat or keyway 12 formed in shaft 10 and having a depth A (see Fig. 5) which is substantially equal to the depth B of said keyseat 12 (see Figs. 1 and 2) whereby said keyseat 12 will be, for all practical purposes, completely filled by the body portion 17 throughout the length of the latter. In the embodiment of the invention shown it is important that the depth A of the body portion 17 be no greater than the depth B of the keyseat 12 in order that relative rotation may occur between the shaft 10 and hub 14 when the key 16 breaks, as hereinafter described, to release an overload driving condition. It is also desirable that the depths A and B respectively of the key 16 and keyseat 12 be equal in order that the body 17 and key 16 will completely fill the keyseat 12 and over the top surface 18 of which a clamping strip, hereinafter described, may slide whenever relative rotation between the shaft and hub occurs. The width C of key 16 is such that the body portion 17 will be received snugly between the parallel side walls of the keyseat 12.

Key 16 also includes a pair of integral ears, legs or lugs 19, one adjacent each end of the elongated body portion 17 and the ends of key 16. These ears, legs or lugs 19 are adapted to extend into the groove, key slot or keyway 15 in the hub 14 and their width C is also such that their opposite side surfaces snugly engage the parallel spaced side walls of keyway 15.

From the description thus far given it will be apparent that the key 16 is generally U-shaped and includes an elongated bottom or body portion 17 and two spaced ears, legs or lugs 19 and that the body portion 17 is adapted to be contained wholly within a keyseat in one of the members to be releasably interconnected, while the ears, legs or lugs 19 are adapted to be contained partly in the keyseat or keyway in one of the members to be drivingly interconnected and partly in the keyseat or keyway of the other member. It will also be apparent that the ears, legs or lugs 19 of the key 16 are the only parts of the key 16 which extend between the driving and driven members 10 and 11 to interlock them and that, therefore, failure of these ears, legs or lugs 19 by breaking from the key 16 will cause the release or severance of the driving interlock, interconnection or relation between the members 10 and 11.

As indicated in Figs. 2 and 5 of the drawings, the depth D of the ears, legs or lugs 19 is slightly less than the depth E of the complete keyway formed by the keyseats 12 and 15. This slight difference in these dimensions is desirable in order that the tops 20 of ears, legs or lugs 19 will not normally engage the base wall 21 of the keyway 15 in the wheel hub 14.

The wheel 11 and key 16 are retained against axial movement along shaft 10 by a clamping device in the form of a set screw 22 threaded in the hub 14 which engages a strip or piece of tough material, herein shown as a rectangular bar of hard wood 23, that is contained wholly within the keyway 15 in the hub 14 and extends between the ears, legs or lugs 19 of the key 16. While only one set screw 22 is shown in the drawings, it will be seen that any desired number of said set screws 22 may be employed. If more than one set screw 22 is employed it is important that they clamp the key 16 in the keyseat 12 through the piece of tough material 23.

As previously set forth, the key 16 is made of a brittle material which is capable of and will break, crack or snap under shear loads rather than have to be cut. While there are numerous materials having such characteristics which may be employed to make the key 16 I have found that cast iron is a very desirable, easily obtainable, inexpensive material for making the key 16 and that its properties are excellently suited to the present purpose. It is well-known that cast iron is brittle, relatively inflexible, and in the presence of oily substances forms a good bearing.

In the operation of the apparatus shown in the drawings the shaft 10 is releasably connected to the wheel 11 through the breakable key 16, and shaft 10, when rotated in either direction, will, of course, drive the wheel 11 through said breakable key 16. When shaft 10 drives the wheel 11, or vice versa, in either direction, the ears, legs or lugs 19 of key 16 will be subjected to shearing strains by the spaced parallel side walls of the keyseats, key slots or keyways 12 and 15 in the shaft 10 and hub 14, respectively, and so long as these strains never exceed the shear strength of the ears, legs, or lugs 19 of key 16 the shaft will continue to drive the wheel. Upon the occurrence of an overload driving condition wherein the shear strains acting upon the ears, legs or lugs 19 exceed their shear strength, then the ears, legs or lugs 19 will crack, snap or otherwise be broken from the body portion 17 of key 16 substantially in the plane of the top surface 18 of the body portion 19 of the key. This breaking or snapping of the ears, legs or lugs 19 from the key, of course, suddenly releases or severs the driving relation between the shaft 10 and wheel 11 and relative rotation between them may then occur.

Upon the severance of the ears, legs or lugs 19 from the key 16, the pieces 24 of the ears, legs or lugs 19 which are contained in the key slot 15 in hub 14 may move radially outward in said key slot or keyway 15 a distance equal to the difference between dimensions D and E whereby the rough sides formed thereon when the ears, legs or lugs 19 cracked from the key 16 will not engage the shaft 10 with sufficient pressure to score it as the shaft and wheel rotate with respect to each other. In this connection, the fact that the key 16 is made of a material which forms a good bearing is advantageous in minimizing the tendency of the broken portions of the ears, legs or lugs to score either the shaft 10 or the bore in hub 14.

It will also be seen that when relative rotation between shaft 10 and hub 14 occurs due to the breaking of the ears, legs or lugs 19 of the key 16, the piece 23 of tough material may revolve around the shaft 10 and across the top of body portion 17 of the key without scoring either the shaft 10 or the bore in the hub 14.

It is to permit this action that the depth A of the body portion 17 of key 16 is preferably equal to the depth B of the keyseat 15 in shaft 10. It may be pointed out that the piece or strip of tough material 23 in the keyway 15 of hub 14 functions to hold the body portion 17 of key 16 in the groove, key slot or keyway 12 at all times when said grooves, keyways or key slots 12 and 15 are aligned.

In Fig. 6 of the drawings there is shown a modified form of breakable overload release key 25. This key is substantially identical to the key 16 shown in Figs. 1 through 5 of the drawings except that it includes only one ear, leg or lug 26 whereas the key 16 includes two ears, legs or lugs 19.

From the foregoing description it will be seen that the overload release device provided by this invention may be used as a connector between any conventional machine elements normally interconnected by rectangular keys of the type herein suggested merely by removing the old keys and substituting the device provided by this invention therefor. While I have shown and/or described keys 16 and 25 as being held in their keyways by set screws and pieces of tough material, such as wood, it is to be understood that devices or means other than those herein specifically described may be employed for retaining the elements against movement with respect to each other.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Means for releasably interlocking in driving and driven relation a shaft having a keyseat and a hub having a key slot comprising a key adapted to be received in said keyseat and key slot to interlock said shaft and hub through said keyseat and key slot, said key including an elongated body portion having a width and depth substantially equal to the width and depth of said keyseat and fitting entirely within the keyseat so that the keyseat is substantially completely filled by said body portion throughout the length of the keyseat, said key also including a pair of lugs one projecting from each end of said body portion and adapted to extend into said key slot, the depth of said lugs being slightly less than the depth of the key slot so that the lugs only partly fill the key slot but which provide for driving and driven relation between the shaft and hub, said pair of lugs being made of frangible bearing material so as to be breakable from said body portion by the force occurring from a predetermined overload driving condition whereby relative rotation occurs between the hub and the shaft, said lugs when broken from said body portion dropping into and remaining in the key slot and being carried therewith out of contact with the shaft as the hub rotates, said body portion remaining in the keyseat and being carried therewith as the shaft rotates, a piece of relatively soft material carried in said key slot between said pair of lugs, and setscrew means extending through said hub for clamping said piece of soft material to said body portion to provide for holding the key in said keyseat and key slot when said keyseat and key slot are aligned.

2. Means for releasably interlocking in driving and driven relation a shaft having a keyseat and a hub having a key slot comprising a key adapted to be received in said keyseat and key slot to interlock said shaft and hub through said keyseat and key slot, said key including an elongated body portion having a width and depth substantially equal to the width and depth of said keyseat and fitting entirely within the keyseat so that the keyseat is substantially completely filled by said body portion throughout the length of the keyseat, said key also including lug means projecting from said body portion and adapted to extend into said key slot, the depth of said lug means being slightly less than the depth of the key slot so that the lug means only partly fill the key slot but which provide for driving and driven relation between the shaft and hub, said lug means being made of cast iron so as to be breakable from said body portion by the force occurring from a predetermined overload driving condition whereby relative rotation occurs between the hub and the shaft, said lug means when broken from said body portion dropping into and remaining in the key slot and being carried therewith out of contact with the shaft as the hub rotates, said body portion remaining in the keyseat and being carried therewith as the shaft rotates, a piece of relatively soft material carried in said key slot, and setscrew means extending through said hub for clamping said piece of soft material to said body portion to provide for holding the key in said keyseat and key slot when said keyseat and key slot are aligned.

References Cited in the file of this patent
UNITED STATES PATENTS

| | | |
|---|---|---|
| 267,391 | Woolson | Nov. 14, 1882 |
| 531,046 | King | Dec. 18, 1894 |
| 567,614 | Rieppel | Sept. 15, 1896 |
| 882,643 | Lundgren | Mar. 24, 1908 |
| 912,488 | Richards | Feb. 16, 1909 |
| 1,160,311 | Morse | Nov. 16, 1915 |
| 1,339,273 | Miller | May 4, 1920 |
| 1,493,188 | Campbell | May 6, 1924 |
| 1,685,098 | Sklovsky | Sept. 25, 1928 |
| 2,151,045 | Ploehn | Mar. 21, 1939 |